United States Patent [19]

Newhouse et al.

[11] 4,210,913

[45] Jul. 1, 1980

[54] PASSIVE DETECTION AND TRACKING APPARATUS

[75] Inventors: Paul D. Newhouse, Linthicum Heights; Charles M. Allen, Arbutus, both of Md.

[73] Assignee: Westinghouse Electric Corp., Pittsburgh, Pa.

[21] Appl. No.: 640,050

[22] Filed: Feb. 13, 1957

[51] Int. Cl.² ............................................. G01S 3/28
[52] U.S. Cl. .................................... 343/123; 343/119
[58] Field of Search ............... 343/5.1, 7.4, 16, 100.4, 343/100.5, 100.6, 114.5, 115, 117, 119, 123, 100 CL Primary Examiner—Maynard R. Wilbur
Assistant Examiner—Richard E. Berger
Attorney, Agent, or Firm—R. G. Brodahl

EXEMPLARY CLAIM

1. In passive detection and tracking apparatus, in combination, a plurality of directional signal obtaining means for obtaining from radiant energy received from the same source a plurality of signals which vary in predetermined manners with variations in the direction from the passive detection and tracking apparatus to said source, gating means operatively connected to said plurality of signal obtaining means, and indicator means operatively connected to said gating means, said gating means being constructed and arranged to pass to the indicator means certain signals only while said plurality of signals have preselected relative characteristics with respect to each other, said indicator means being constructed and arranged to utilize the passed signals to provide an indication of the direction to said source.

14 Claims, 11 Drawing Figures

PASSIVE DETECTION AND TRACKING APPARATUS

This invention relates to passive detection and tracking apparatus, and more particularly, to passive detection and tracking apparatus having means for eliminating ambiguity in directional information supplied about a source of pulsed radiant energy.

Passive detection and tracking apparatus, as the name implies, is detection and tracking apparatus having no source of radiant energy, but utilizing a source of radiant energy located elsewhere for obtaining directional information about the source with respect to the location of the passive detection and tracking apparatus, and also for obtaining other information, for example, the closing time between the source and the passive detection and tracking apparatus where there is relative motion between these two.

Directional information may be conveniently displayed by a cathode ray tube having pairs of vertical and horizontal deflection plates, a luminous spot being provided on the screen of the tube in a position representing the elevation and azimuth of the source of radiant energy with respect to a preselected direction or axis from the passive detection and tracking apparatus.

A convenient means for obtaining the aforementioned luminous spot includes two pairs of directional antennas, the antennas of each pair preferably having similar directional patterns of response and overlapping about a common axis or predetermined direction to a predetermined degree in a predetermined plane, the planes of the two pairs of antennas being substantially perpendicular to each other. The pairs of antennas supply their outputs to pairs of detectors or demodulators which are preferably similar and which are operatively connected to the aforementioned pairs of deflection plates, the pulses applied to any given pair of plates being of the same polarity but varying in amplitude with respect to each other in accordance with the direction to the source of radiant energy and the directional pattern of response of the antenna providing the pulse. Accordingly, the beam of the cathode ray tube is deflected selectively in opposite directions in accordance with which of the pulses has the greater amplitude, and the beam is deflected in an amount depending upon the difference in amplitudes.

Such an arrangement, however, has the disadvantage that, since the deflection of the beam depends upon a difference voltage, on each side of the aforementioned axis or predetermined direction in each plane there are two different values of signal strength which can produce the same difference voltage, resulting in an ambiguity which renders the indication and directional information unreliable.

The apparatus of the instant invention overcomes this and other disadvantages of the prior art by adding an additional directional antenna having its maximum response from the direction corresponding to the axis of measurement or said predetermined direction, and utilizing the demodulated output obtained from this additional antenna after amplification to control the indication on the cathode ray tube and to eliminate the aforementioned ambiguity. This is accomplished by providing gating and pulse comparison circuits for utilizing the output of three antennas to control the position of the spot in azimuth, and utilizing the outputs of three antennas, one of which may be common to the azimuth circuit, for controlling the position of the spot in elevation.

Accordingly, it is a primary object of the instant invention to provide new and improved passive detection and tracking apparatus.

Another object of the invention is to provide new and improved passive detection and tracking apparatus including circuit means for eliminating ambiguities in indicated directional information about the direction from the passive detection and tracking apparatus to a source of pulsed radiant energy.

A further object is to provide new and improved passive detection and tracking apparatus employing improved antenna means for providing a more reliable indication of direction.

Still a further object is to provide a new and improved indicator circuit for use in passive detection and tracking apparatus.

Other objects and advantages will become apparent after a study of the following specification when read in connection with the accompanying drawings, in which.

Figure 1:
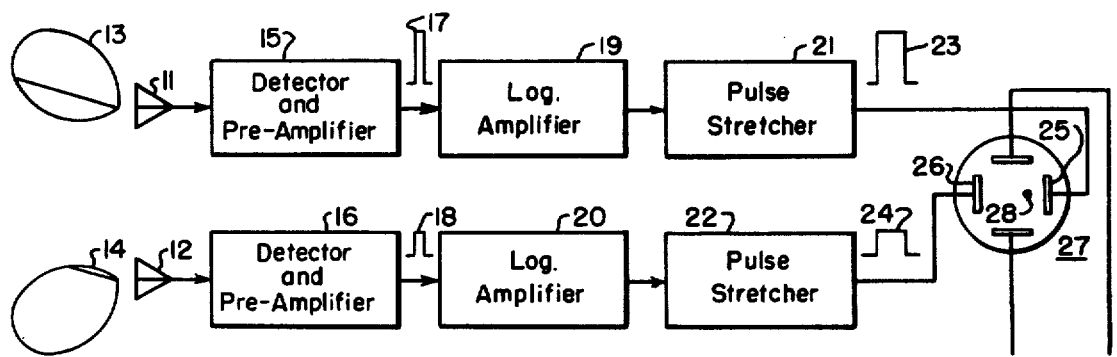
FIG. 1 is a block diagram of simple passive detection and tracking apparatus employing cathode ray tube means for indicating the direction of a source of radiant energy as measured in one plane, for example, as measured in azimuth, and is shown to assist in describing the instant invention.

Particular attention should be paid now to the drawings for a more complete understanding of the invention, in which like reference numerals are used throughout to designate like parts, and in particular to FIG. 1 thereof. A pair of antennas 11 and 12 have similar directional patterns of response 13 and 14 but in different directions, the patterns of response 13 and 14 overlapping to some extent in a predetermined plane. Assuming for the purpose of description only, that the antennas 11 and 12 are receiving radiant energy from a source lying in a direction indicated by the lines in the respective patterns of response, the outputs of the detectors and preamplifiers of conventional design shown in block form and generally designated 15 and 16 will be pulses having amplitudes corresponding to the signal strengths applied to the antennas in accordance with their directional characteristics, as indicated by the pulses 17 and 18, these pulses 17 and 18 being applied to amplifiers 19 and 20, respectively. Preferably, the amplifiers 19 and 20 are of the logarithmic type and have outputs which are proportional in amplitude to the logarithms of the inputs applied thereto. The outputs of the aforementioned amplifiers 19 and 20 are applied to a pair of pulse stretchers 21 and 22, respectively, which are preferably similar and which may be of conventional design. Each of the pulse stretchers may be similar to a circuit known in the art as a "box-car" circuit, and may include a diode, a bucket condenser, and a discharge triode, suitable means, not shown, being provided for controlling the charging and discharging of the bucket condenser. The broadened pulse outputs 23 and 24 of the pulse stretchers 21 and 22, respectively, are applied to one pair of deflection plates 25 and 26 of a cathode ray tube generally designated 27.

The cathode ray tube 27 includes beam-forming means, not shown in FIG. 1, and the beam is deflected by the aforementioned pulses 23 and 24 applied to the aforementioned deflection plates 25 and 26, respectively. Since the pulse 23 is greater in amplitude than the pulse 24, the beam is deflected toward the plate 25 and a spot indication 28 is provided on the screen of the cathode ray tube 27 having a position indicative of the direction of the source of radiant energy.

Figure 6A:
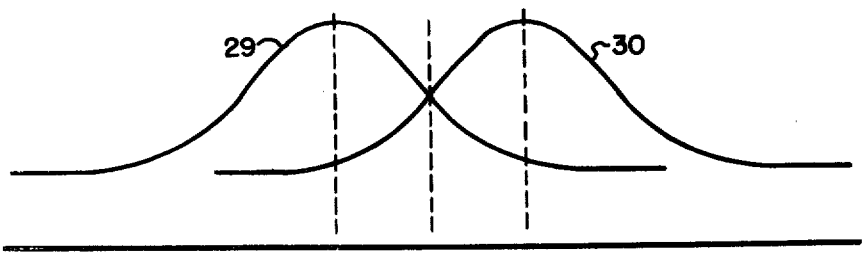
FIGS. 6A and 6B are curves or graphs illustrating the operation of the apparatus of FIG. 1.

Assume now by way of description, that, in accordance with the aforementioned directional patterns of response 13 and 14 of antennas 11 and 12, respectively, the outputs of the logarithmic amplifiers 19 and 20 are represented respectively by the curves 30 and 29, respectively, of FIG. 6A, to which particular attention is directed. Assume further that the directional patterns of response 13 and 14 are so selected that the outputs of the aforementioned logarithmic amplifiers are equal when a signal is coming from a direction corresponding to the axis or preselected direction of measurement, and that the signals from the logarithmic amplifiers 19 and 20 are each a maximum value when the source is located at an angle of 30° plus or 30° minus, respectively, with respect to the aforementioned axis of measurement.

Figure 6B:
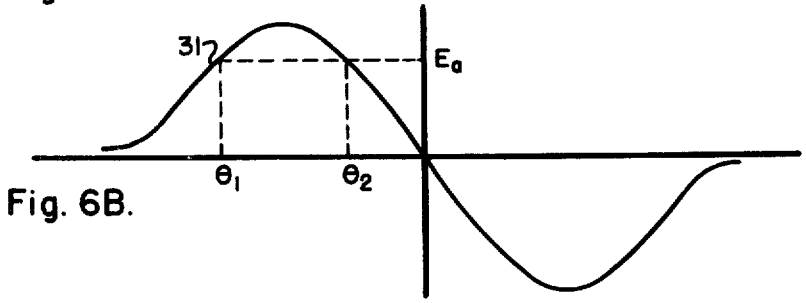

The graph of FIG. 6B illustrates the difference voltage between the outputs of the logarithmic amplifiers, in accordance with changes in direction within the plane of measurement; in other words, the curve 31 of FIG. 6B illustrates the difference voltage, and it should be noted that for a source of radiant energy lying within the pattern of response of, for example, the antenna having maximum response from a source having an angular direction of minus 30° with respect to the axis of measurement, there are two angular positions denoted $\theta_1$ and $\theta_2$ which result in the same difference voltage. In a corresponding manner, there are two angular positions on the other side of the axis of measurement which provide the same difference voltage.

Since the beam of the cathode ray tube is deflected in an amount corresponding to the difference voltage, it is seen that an ambiguity may exist when the location of the source of radiant energy has certain angular directions with respect to the preselected axis of measurement.

Figure 2:
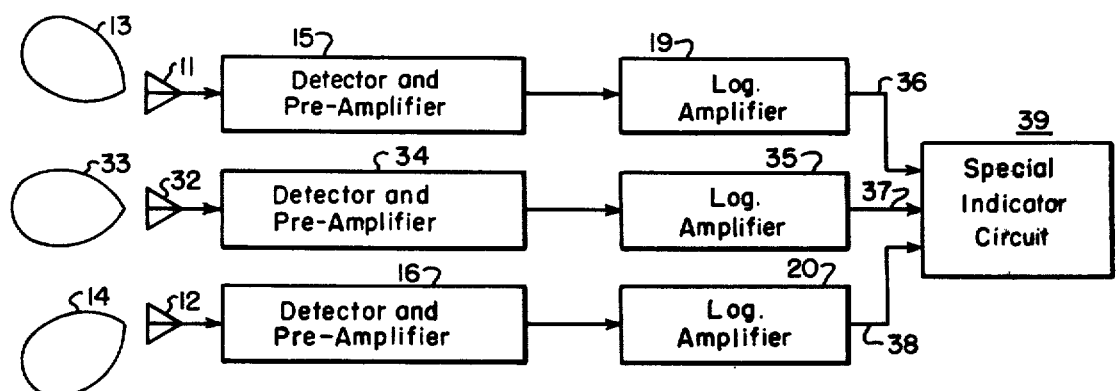
FIG. 2 is a block diagram of apparatus according to the preferred embodiment of the instant invention for providing reliable directional information in a single plane of measurement.

As aforementioned, the apparatus of the instant invention is constructed and arranged to eliminate this ambiguity to thereby provide a more reliable indication of the direction to the source of radiant energy. An additional antenna is provided, this additional antenna being designated 32 and shown in FIGS. 2 and 3. The antenna 32 also has a directional pattern of response 33 and provides its greatest signal output when the source of radiant energy is located in a direction corresponding to the axis of measurement. The antenna 32 supplies its output by any convenient conducting means to a detector and preamplifier shown in block form and designated 34, which supplies an output to a logarithmic amplifier 35. The outputs of the logarithmic amplifiers 19, 35 and 20 energized from antennas 11, 32 and 12, respectively, are applied by way of conducting means 36, 37 and 38, respectively, to a special indicator circuit shown in block form and generally designated 39.

Figure 5:
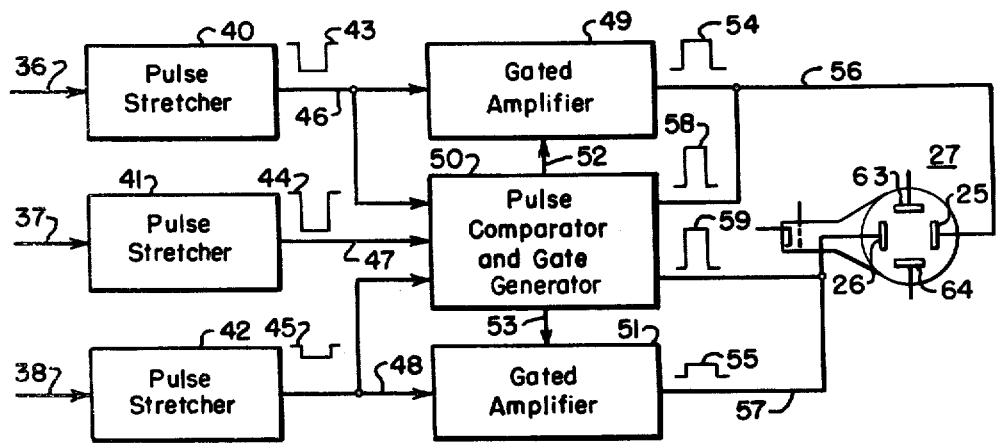
FIG. 5 is a circuit diagram, in block form, of the special indicator circuits employed in the instant invention.

Particular reference should be paid now to FIG. 5 in which there is shown in block form the circuit arrangement of the special indicator circuit generally designated 39. The aforementioned conducting means 36, 37 and 38 provide inputs to three similar pulse stretchers 40, 41 and 42, respectively, the outputs of the pulse stretchers being of the same polarity as indicated by the pulses 43, 44 and 45, respectively, on conductor means 46, 47 and 48, respectively, but varying in amplitude in accordance with variations in signal strength applied to the respective detector means in accordance with the respective antenna patterns of response. The broadened pulse 43 on conductor means 46 is supplied to a gated amplifier shown in block form and designated 49, and also to a pulse comparison and gate generating circuit shown in block form and designated 50. The aforementioned pulse stretcher 41 also supplies a pulse output by way of conducting means 47 to the pulse comparison and gate generating circuit 50, and the aforementioned pulse stretcher 42 supplies a pulse output by way of conducting means 48 to a gated amplifier shown in block form and designated 51, and also the pulse stretcher 42 supplies a pulse output to the aforementioned pulse comparison and gate generating circuit 50. The pulse comparison and gate generating circuit 50 supplies a gate by way of conducting means 52 and 53 to the aforementioned gated amplifiers 49 and 51, respectively, under certain conditions.

The pulse comparison and gate or blanking pulse generating circuit 50 is constructed and arranged in a manner whereby when the pulse 44 representing the log of $P_C$, this being the output of the center antenna 32, exceeds the amplitudes of the pulses 43 and 45 representing the log of $P_R$ and $P_L$, respectively, these being the outputs of antennas 11 and 12, the pulse generator in the apparatus shown in block form at 50 is not triggered. Accordingly, the outputs of the gated amplifiers 49 and 51, being pulses which vary in amplitude with variations in the azimuth of the source, and represented by pulses 54 and 55, respectively, on conducting means 56 and 57, respectively, are applied to the horizontal deflection plates 25 and 26, respectively, of the aforementioned cathode ray tube indicator 27 where, in effect, they are subtracted with the result that the beam of the cathode ray tube is deflected toward the plate 25, it being assumed for purposes of description that pulse 54 is greater in amplitude than pulse 55, and a spot, not shown, appears on the screen of the indicator tube 27, which screen may be calibrated in the manner shown in FIG. 4.

Figure 4:
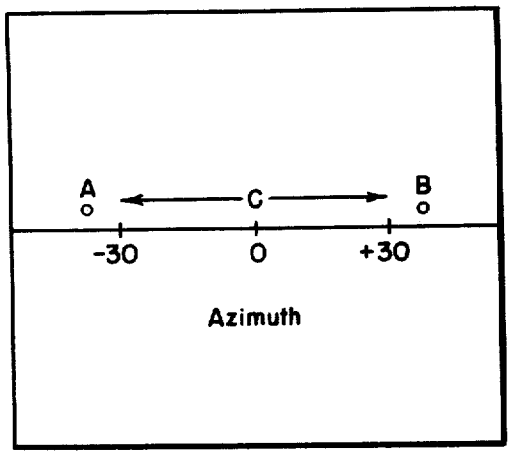
FIG. 4 is a view illustrating the manner in which targets may be shown on the screen of a cathode ray tube employed in the instant invention.

It will be readily understood that all targets or sources which are within the angle of minus 30° to plus 30° in azimuth, appear in the zone of the screen of FIG. 4 represented by the area designated C.

Figure 7:
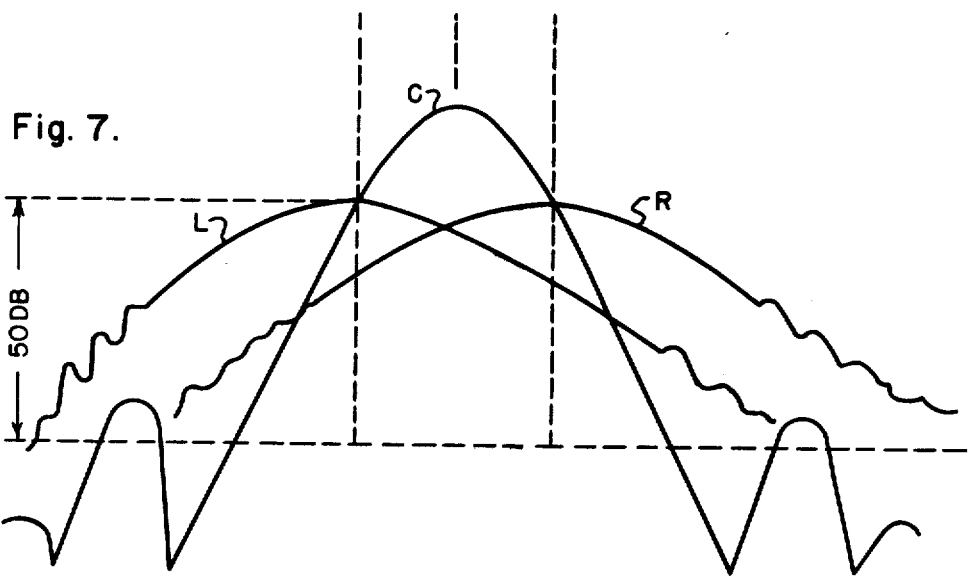
FIG. 7 is a graph illustrating the operation of the apparatus embodying the instant invention and shown in FIG. 2.

For azimuth values more negative than minus 30°, the log of $P_L$ represented by the curve L of FIG. 7 exceeds the log of $P_C$ represented by the curve C, and also exceeds the log of $P_R$ represented by the curve R of FIG. 7. Under these conditions where the voltage representing the log of $P_L$ exceeds the pulse amplitudes corresponding to the log of $P_C$ and the log of $P_R$, the aforementioned pulse comparison and gate generating circuit 50 is constructed and arranged to provide a gate to the gated amplifiers 49 and 51 which blanks out both of the gated amplifiers and further generates and applies the pulse 59 on conducting means 57, which is also connected to the circuit 50 to receive the output pulse 59 therefrom, to the left deflection plate 26 of cathode ray tube 27. A spot appears at A on the screen of the cathode ray tube as shown in FIG. 4. For azimuth values more positive than plus 30°, the log of $P_R$ exceeds the log of $P_C$ of the log of $P_L$. The pulse comparator and generator 50 is constructed and arranged under such a condition to provide a gate which blanks out both of the gated amplifiers 49 and 51, and to supply a pulse 58 to lead 56 and thence to deflection plate 25. Accordingly, the beam is deflected to the right and a spot appears at point B on the screen of the cathode ray tube as shown in FIG. 4.

Accordingly, an arrangement is provided whereby azimuth information is displayed without ambiguity. All targets or sources having an azimuth angle of greater than minus 30° appear at point A; all targets or sources having an azimuth value greater than plus 30° appear at point B; and all targets within a minus 30° to plus 30° azimuth value appear in zone C which may be calibrated in azimuth, in a manner well known to those skilled in the art.

Figure 8:
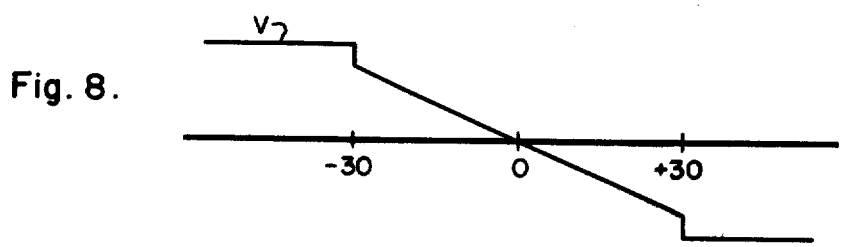
FIG. 8 is a graph further illustrating the operation of the apparatus embodying the instant invention.

Particular attention should be paid now to FIG. 8, in which the curve V thereof illustrates the azimuth voltage, and further illustrates the operation of the circuit of FIG. 5. It should be noted that the difference azimuth voltage of the display tube changes in a substantially linear manner from a value corresponding to an azimuth angle of minus 30° to a value corresponding to an azimuth angle of plus 30°, at which points the azimuth voltage jumps quickly to levels which are maintained constant for any further increases in the azimuth angle beyond minus 30° or plus 30°.

Figure 10:
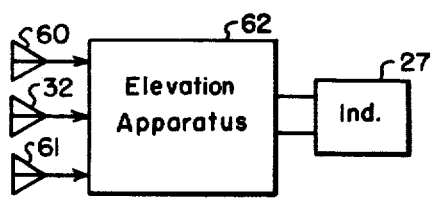
FIG. 10 is a diagram in block form of the elevation apparatus.

Particular attention should be paid now again to FIG. 3, where an additional pair of antennas 60 and 61 are shown having similar directional patterns of response, not shown, and oriented in a vertical plane substantially perpendicular to the plane of the antennas 11 and 12. The vertical information or elevation information antennas 60 and 61, together with center antenna 32, supply their outputs to an elevation information circuit 62, FIG. 10, which may be substantially identical with the circuits of FIG. 2 and may have a special indicator circuit similar to the circuit of FIG. 5, except that as will readily be understood, the special indicator circuit for providing elevation information is connected to a pair of vertical deflection plates, these vertical deflection plates being designated 63 and 64, FIG. 5.

Figure 3:
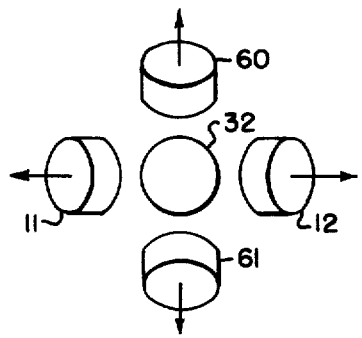
FIG. 3 is a front elevational view of antenna apparatus suitable for use in the instant invention for providing directional information in two substantially perpendicular planes of measurement, for example, directional information about the elevation and azimuth of a source of pulsed radiant energy with respect to the location of the passive detection and tracking apparatus.
Figure 9:
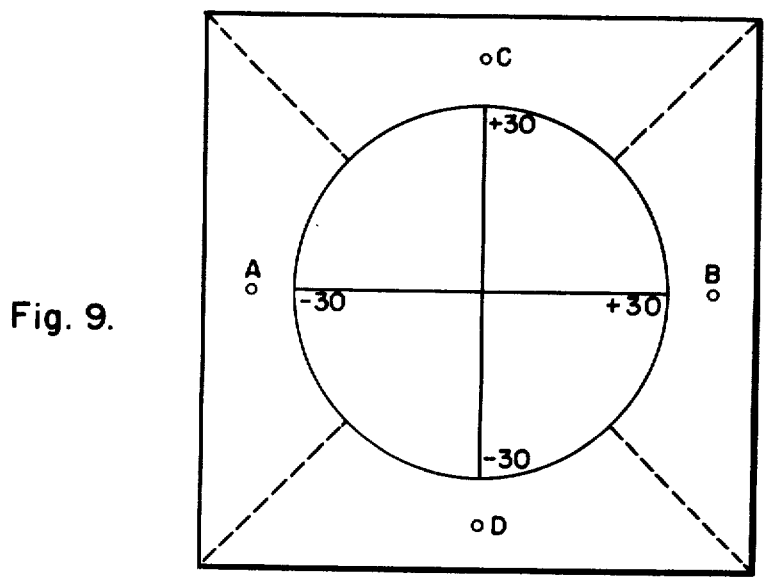
FIG. 9 is a front view of the screen of cathode ray tube indicator means employed in the apparatus of the instant invention.

Particular attention should be paid now to FIG. 9 in which a screen arrangement for a cathode ray indicator tube according to the instant invention and having five antennas as shown in FIG. 3 for providing elevation and azimuth information is shown. Targets or sources within the angle of minus 30° to plus 30° in azimuth appear within the circle and targets within the elevation range plus 30° to minus 30° appear within the circle, whereas, targets having an azimuth of greater negative value than minus 30° appear at point A; targets having a greater positive azimuth value than plus 30° appear at point B; targets having a greater positive elevation value than plus 30° appear at point C; and targets or sources having a greater negative elevation than minus 30° appear at point D.

It is accordingly seen that the apparatus accomplishes the purposes of the invention hereinbefore stated, to provide a means free from ambiguity for indicating the direction to a source of pulsed radiant energy with respect to the passive detection and tracking apparatus.

Whereas, pairs of antennas having similar directional patterns of response have been shown and described, it should be understood that pairs of antennas having dissimilar patterns could be employed if desired, suitable recalibration of the tube screen being made.

Whereas the apparatus has been shown and described with respect to a preferred embodiment thereof which gives satisfactory results, it should be understood that modifications may be made and equivalents substituted without departing from the scope of the invention.

We claim as our invention:

1. In passive detection and tracking apparatus, in combination, a plurality of directional signal obtaining means for obtaining from radiant energy received from the same source a plurality of signals which vary in predetermined manners with variations in the direction from the passive detection and tracking apparatus to said source, gating means operatively connected to said plurality of signal obtaining means, and indicator means operatively connected to said gating means, said gating means being constructed and arranged to pass to the indicator means certains signals only while said plurality of signals have preselected relative characteristics with respect to each other, said indicator means being constructed and arranged to utilize the passed signals to provide an indication of the direction to said source.

2. In passive detection and tracking apparatus, in combination, a plurality of directional signal obtaining means for obtaining from radiant energy received from the same source a plurality of signals which vary in predetermined manners with variations in the direction from the passive detection and tracking apparatus to said source, gating and signal generating means operatively connected to said plurality of signal obtaining means, and indicator means operatively connected to said gating and signal generating means, said gating and signal generating means being constructed and arranged to pass to the indicator means certain signals only while said plurality of signals have preselected relative characteristics with respect to each other, said indicator means being constructed and arranged to utilize the passed signals to provide an indication of the direction to said source, said gating and signal generating means being further constructed and arranged to generate an additional signal and apply the additional signal to the indicator means for indicating use thereby while said plurality of signals have preselected other relative characteristics with respect to each other.

3. In passive detection and tracking apparatus, in combination, first, second and third directional antenna means having overlapping patterns of response in a predetermined plane, first, second and third detector means operatively connected to said first, second and third antenna means respectively for obtaining first, second and third signals from the same source of radiant energy, cathode ray tube direction indicating means including beam forming means and a pair of oppositely disposed deflection plates, first gated amplifier means operatively connecting said first detector means to one of said deflection plates, second gated amplifier means operatively connecting said second detector means to the other of said deflection plates, and signal comparing and gate generating means operatively connected to all said first, second and third detector means, said signal comparing and gate generating means being also operatively connected to said first and second gated amplifier means and constructed and arranged to supply gates to both said first and second gated amplifier means to prevent the passage of signals therethrough while said first, second and third signals have preselected relative amplitudes with respect to each other.

4. In passive detection and tracking apparatus, in combination, first, second and third directional antenna means having overlapping patterns of response in a predetermined plane, first, second and third detector means operatively connected to said first, second and third antenna means respectively for obtaining from radiant energy received from the same source first, second and third signals which vary in amplitude in predetermined manners with variations in the direction from the passive detection and tracking apparatus to said source, gating means operatively connected to said first, second and third detector means, and indicator means operatively connected to said gating means, said gating means being constructed and arranged to pass to the indicator means certain signals only while said first, second and third signals have preselected relative amplitudes with respect to each other, said indicator means being constructed and arranged to utilize the passed signals to provide an indication of the direction to said source.

5. In passive detection and tracking apparatus, in combination, first, second and third directional antenna means having overlapping patterns of response in a predetermined plane, first, second and third detector means operatively connected to said first, second and third antenna means respectively for obtaining from radiant energy received from the same source first, second and third signals which vary in amplitude in predetermined manners with variations in the direction from the passive detection and tracking apparatus to said source, gating and signal generating means operatively connected to said first, second and third detector means, and indicator means operatively connected to said gating and signal generating means, said gating and signal generating means being constructed and arranged to pass to the indicator means certain signals only while said first, second and third signals have preselected relative amplitudes with respect to each other, said indicator means means being constructed and arranged to utilize the passed signals to provide an indication of the direction to said source, said gating and signal generating means being further constructed and arranged to generate an additional signal and apply the additional signal to the indicator means for indicating use thereby while said first, second and third signals have preselected other relative amplitudes with respect to each other.

6. In passive detection and tracking apparatus, in combination, first, second and third directional antenna means having overlapping patterns of response in a predetermined plane, first, second and third detector means operatively connected to said first, second and third antenna means respectively for obtaining from pulsed radiant energy received from the same source first, second and third pulse signals which vary in amplitude in predetermined manner with variations in the direction from the passive detection and tracking apparatus to said source as measured in said plane, first, second and third pulse stretcher means operatively connected to said first, second and third detector means respectively to be energized therefrom, gating means operatively connected to said first, second and third pulse stretcher means, and indicator means operatively connected to said gating means, said gating means being constructed and arranged to pass to the indicator means certain pulses only while said first, second and third signals have preselected relative amplitudes with respect to each other, said indicator means being constructed and arranged to utilize the passed pulses to provide an indication of the direction to said source.

7. In passive detection and tracking apparatus, in combination, a plurality of directional signal obtaining means for obtaining from radiant energy received from the same source a plurality of signals which vary in amplitude in predetermined manners with variations in the direction from the passive detection and tracking apparatus to said source, means operatively connected to said plurality of signal obtaining means for broadening the signals, gating means operatively connected to said signal broadening means, and indicator means operatively connected to said gating means, said gating means being constructed and arranged to pass to the indicator means certain signals only while said plurality of signals have preselected relative amplitudes with respect to each other, said indicator means being constructed and arranged to utilize the passed signals to provide an indication of the direction to said source.

8. In passive detection and tracking apparatus, in combination, a plurality of directional signal obtaining means for obtaining from radiant energy received from the same source a plurality of signals which vary in amplitude in predetermined manners with variations in the direction from the passive detection and tracking apparatus to said source, signal broadening means operatively connected to said plurality of signal obtaining means, gating and signal generating means operatively connected to said signal broadening means, and indicator means operatively connected to said gating and signal generating means, said gating and signal generating means being constructed and arranged to pass to the indicator means certain signals only while said plurality of signals have preselected relative amplitudes with respect to each other, said indicator means being constructed and arranged to utilize the passed signals to provide an indication of the direction to said source, said gating and signal generating means being further constructed and arranged to generate an additional signal and apply the additional signal to the indicator means for indicating use thereby while said plurality of signals have preselected other relative amplitudes with respect to each other.

9. In passive detection and tracking apparatus, in combination, first, second and third directional antenna means having overlapping patterns of response in a predetermined plane, first, second and third detector means operatively connected to said first, second and third antenna means respectively for obtaining from radiant energy received from the same source first, second and third signals which vary in amplitude in predetermined manners with variations in the direction from the passive detection and tracking apparatus to said source, signal broadening means operatively connected to said first, second and third detector means, gating and signal generating means operatively connected to said signal broadening means, and indicator means operatively connected to said gating and signal generating means, said gating and signal generating means being constructed and arranged to pass to the indicator means certain signals only while said first, second and third signals have preselected relative amplitudes with respect to each other, said indicator means being constructed and arranged to utilize the passed signals to provide an indication of the direction to said source, said gating and signal generating means being further constructed and arranged to generate an additional signal and apply the additional signal to the indicator means for indicating use thereby while said first, second and third signals have preselected other relative amplitudes with respect to each other.

10. In passive detection and tracking apparatus, in combination, first, second and third directional antenna means having overlapping patterns of response in a predetermined plane, the directions of maximum response of the first, second and third antenna means being all different from each other, first, second and third detector means operatively connected to said first, second and third antenna means respectively for obtaining from radiant energy received from the same source first, second and third signals, cathode ray tube direction indicating means including beam forming means and a pair of oppositely disposed deflection plates, first gated amplifier means operatively connecting said first detector means to one of said deflection plates, second gated amplifier means operatively connecting said second detector means to the other of said deflection plates, and signal comparing and gate generating means operatively connected to all said first, second and third detector means, said signal comparing and gate generating means being also operatively connected to said first and second gated amplifier means and constructed and arranged to supply gates to both said first and second gated amplifier means to prevent the passage of signals therethrough while said first signal exceeds in amplitude said second and third signals and also while said second signal exceeds in amplitude said first and third signals.

11. In passive detection and tracking apparatus, in combination, first, second and third directional antenna means having overlapping patterns of response in a predetermined plane, said second antenna means having its maximum response from a predetermined direction in said plane, said first and third antenna means having their maximum responses from directions lying at angles in said plane on either side of the direction of maximum response of the second antenna means, first, second and third detector means operatively connected to said first, second and third antenna means respectively, said first, second and third detector means providing from radiant energy received from the same source first, second and third signals which vary in amplitude in predetermined manners with variations in the direction from the passive detection and tracking apparatus to said source, gating and signal generating means operatively connected to said first, second and third detector means, and indicator means operatively connected to said gating and signal generating means, said gating and signal generating means being constructed and arranged to pass to the indicator means signals from the first and third detector means while the signal from the second detector means exceeds in amplitude the signals from the first and third detector means, said indicator means being constructed and arranged to utilize the passed signals to provide an indication of the direction to said source, said gating and signal generating means being further constructed and arranged to generate an additional signal and apply the additional signal to the indicator means for indicating use thereby while said first signal exceeds in amplitude said second and third signals and also while said third signal exceeds in amplitude said first and second signals.

12. In passive detection and tracking apparatus, in combination, first, second and third directional antenna means having overlapping patterns of response in a predetermined plane, the direction of maximum response of the second antenna means being in a preselected direction in said plane, the directions of maximum response of the first and third antenna means lying at angles in said plane on either side of said preselected direction, first, second and third detector means operatively connected to said first, second and third antenna means respectively for obtaining from radiant energy received from the same source first, second and third signals which vary in amplitude in predetermined manners with variations in the direction from the passive detection and tracking apparatus to said source, first, second and third signal broadening means operatively connected to said first, second and third detector means respectively to be energized therefrom, gating and signal generating means operatively connected to said first, second and third signal broadening means, and indicator means operatively connected to said gating and signal generating means, said gating and signal generating means being constructed and arranged to pass to the indicator means the signals from the first and third detector means only while the amplitude of the signal from the second detector means exceeds the amplitudes of the signals from the first and third detector means, said indicator means being constructed and arranged to utilize the passed signals to provide an indication of the direction to said source, said gating and signal generating means being further constructed and arranged to generate an additional signal and apply the additional signal to the indicator means for indicating use thereby while said first signal exceeds in amplitude said second and third signals and also while said third signal exceeds in amplitude said first and second signals.

13. Passive detection and tracking apparatus comprising, in combination, first, second and third directional antenna means having overlapping patterns of response in a predetermined plane, first, second and third detector means operatively connected to said first, second and third antenna means respectively for obtaining from pulsed radiant energy received from the same source first, second and third pulse signals which vary in amplitude in predetermined manners with variations in the direction as measured in said predetermined plane from the passive detection and tracking apparatus to said source, first, second and third pulse stretcher means operatively connected to said first, second and third detector means respectively, cathode ray tube direction indicating means including beam forming means and a pair of oppositely disposed deflection plates, first gated amplifier means operatively connecting said first pulse stretcher means to one of said deflection plates, second gated amplifier means operatively connecting said second pulse stretcher means, to the other of said deflection plates, and pulse comparing and gate generating means operatively connected to all said first, second and third pulse stretcher means, said pulse comparing and gate generating means being also operatively connected to said first and second gated amplifier means and constructed and arranged to supply gates to both said first and second gated amplifier means to prevent the passage of pulses therethrough while said first, second and third signals have preselected relative amplitudes with respect to each other.

14. Passive detection and tracking apparatus comprising, in combination, a plurality of radiant energy receiving antenna means adapted to receive pulsed radiant energy from the same source, said plurality of antenna means having predetermined directional patterns of response in the same plane, a plurality of detector means operatively connected to said plurality of antenna means respectively for obtaining demodulated outputs in the form of chains of pulses having amplitudes corresponding to the radiant energy applied to the detector means in accordance with the directional pattern of response of the antenna means operatively connected thereto and the angular direction to said source with respect to a preselected axis of measurement, said angular direction being measured in said plane, pulse comparator means operatively connected to said plurality of detector means, and indicator means operatively connected to said pulse comparator means, said pulse comparator means being constructed and arranged to provide pulsed outputs from said plurality of detector means to the indicator means which vary in amplitude in accordance with variations in the angular direction to the source as measured in said plane while the angle lies within predetermined positive and negative angular limits, said pulse comparator means being constructed and arranged to apply to the indicator means a pulse of predetermined amplitude while the direction to the source exceeds in angle said predetermined angular limits.

* * * * *